Oct. 23, 1934.   L. D. JONES   1,978,382
CHILLING METHOD AND APPARATUS
Filed Jan. 7, 1929
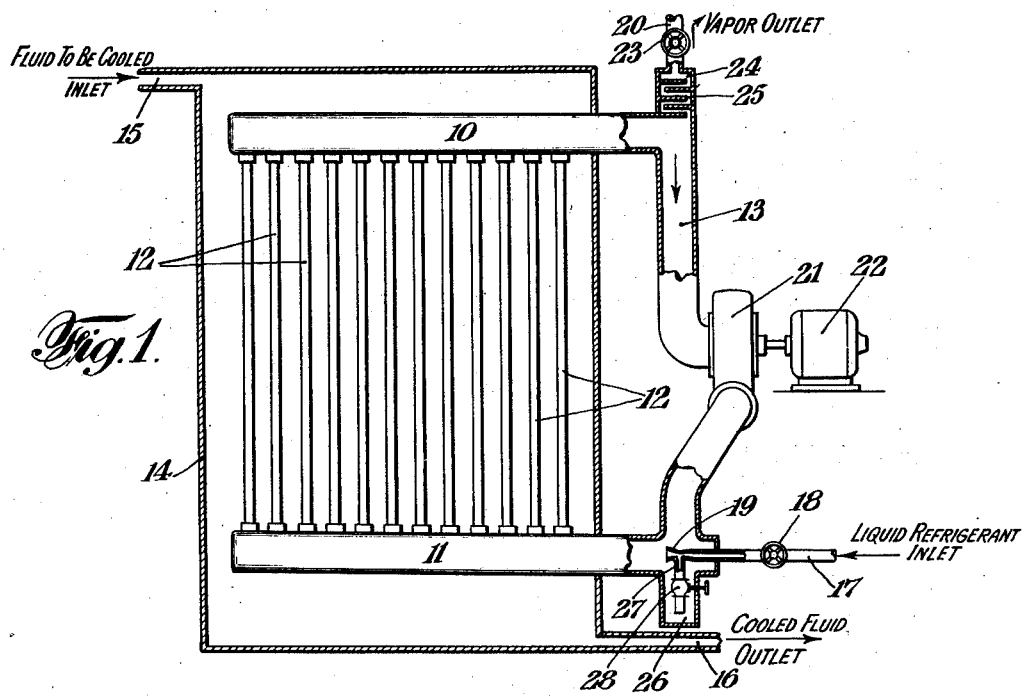
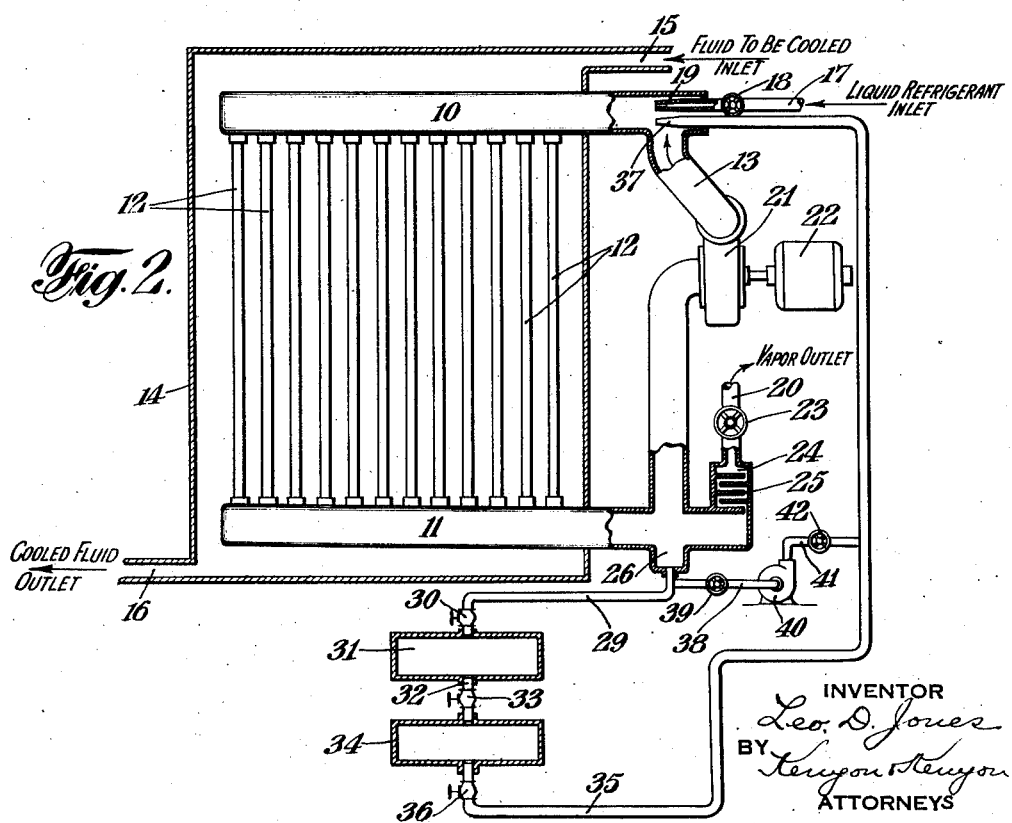

Patented Oct. 23, 1934

1,978,382

UNITED STATES PATENT OFFICE 1,978,382

CHILLING METHOD AND APPARATUS

Leo D. Jones, Philadelphia, Pa., assignor to The Sharples Specialty Company, Philadelphia, Pa., a corporation of Delaware Application January 7, 1929, Serial No. 330,893

13 Claims. (Cl. 62—126)

This invention relates to the art of chilling and particularly to a process and apparatus for effecting a chilling of a desired fluid by means of a volatile liquid refrigerant.

It is an object of this invention to provide a process and apparatus for chilling that are simple, economical, rapid in operation, and capable of chilling a desired substance to a very low temperature.

In accordance with this invention the substance to be chilled is brought into heat interchange relation with a liquid volatile refrigerant; and an important feature of this invention resides in the fact that the cooling medium comprises a volatile liquid refrigerant dispersed in vapors or gases of the refrigerant or in other vapors or gases or in a mixture of vapors and gases of the refrigerant with other vapors or gases. When such a cooling medium is employed all of the advantages of using a gaseous or vaporous cooling medium are obtained and as rapidly as any part of the vapors or gases becomes heated there is available liquid refrigerant which by its vaporization immediately cools that part of the vapors or gases of which the temperature had been raised by the absorption of heat. Moreover, such a cooling medium is capable of effecting an intense degree of cooling, which degree is readily controlled by regulation of the pressure, which may be superatmospheric or subatmospheric pressure, acting upon the medium; and, inasmuch as the liquid refrigerant exists in dispersed form within a vapor or gas, the pressure which controls the temperature of the cooling medium will act uniformly throughout the cooling medium and upon every particle of liquid refrigerant thereof. Such a medium is, in effect, self-cooling and is readily circulated through any cooling system; and it is a feature of this invention that the dispersing of the liquid refrigerant cooperates in the production and maintaining of a circulation of the cooling medium in the cooling system. Another feature of this invention is that dispersed particles of liquid refrigerant that coalesce or deposit upon or flow over the interior surface of the refrigerating-medium container will, at least for the most part, be in the form of a film, a condition that is conducive of evaporation and consequent heat absorption. A further feature of this invention is that dispersed liquid refrigerant which coalesces and collects or accumulates under such conditions that it is not quickly evaporated, is withdrawn in order that the operation of the system may not be interfered with; and such collected or accumulated liquid may be dispersed again in the cooling medium. Another feature is that such collected or accumulated liquid refrigerant may be drawn by entrainment into liquid refrigerant that is being sprayed or dispersed in the cooling system, thus effecting an automatic elimination of accumulated liquid and a redispersing thereof.

In the practice of this invention the cooling medium comprises liquid refrigerant dispersed in vapors or gases. In practice a volatile liquid refrigerant is sprayed or dispersed, preferably in the form of a cloud or mist of liquid particles, in a chamber which is preferably in and of itself a cooling system which is maintained in heat exchange relation with the substance to be cooled. The chamber or system may contain vapors of the refrigerant, or such vapors mixed with other vapors. The cooling system or chamber may take the form of a closed ring-like circuit and the liquid may be sprayed therein in such direction as to produce or assist a circulation of the liquid carrying vapors around the circuit. The liquid volatile refrigerant is sprayed under a pressure that will maintain the refrigerant in liquid form to a desired degree prior to the spraying thereof at its existing temperature and which will produce suitable dispersion of the liquid and produce, if desired, the circulation of the liquid-bearing vapor in the system. The pressure within the chamber or coil or circuit, which determines the temperature of the cooling medium therein, is brought to a predetermined point by withdrawing vapors from the chamber or circuit and maintained at that point.

Other and further objects and advantages of my invention will appear from the following description taken in connection with the accompanying drawing in which like reference characters indicate similar parts, and in which:

Fig. 1 shows in diagrammatic form one form of apparatus which embodies my invention and whereby my process may be practised; and Fig. 2 shows diagrammatically a modification.

In the illustrative embodiments of my invention shown in the drawing, the refrigerant chamber or circuit comprises upper header 10 and lower header 11 joined by tubes 12 of which any number may be employed and also joined by tube 13. The means for bringing a substance to be chilled into heat exchange relation with the refrigerant chamber or circuit is shown as a tank 14 having an inlet 15 and an outlet 16 and enclosing tubes 12 and a part of headers 10 and 11 and whereby a fluid may be brought into heat exchange relation with the chilling chamber or circuit.

In the chilling chamber or circuit liquid volatile refrigerant is sprayed and the chamber or circuit becomes filled with a cooling medium comprising a vapor or gas carrying in dispersed or mist-like or cloud-like form particles of liquid volatile refrigerant; and the mist-forming jet may be so directed as to produce or assist a circulation of such a cooling medium throughout the cooling chamber or circuit. Thus, volatile liquid refrigerant is supplied from any source to pipe 17 controlled by needle valve 18 and is by nozzle 19 dispersed into a fog or mist that is projected across header 11; and the resulting mixture of vapors and particles of liquid will rise through tubes 12 into header 10.

The circulation of the mixed vapors and liquid particles will be assisted, in the construction shown in the drawing, in several ways. Vapors of the refrigerant will be withdrawn from the system through pipe 20 which may advantageously lead from upper header 10, and the action of the spray issuing from nozzle 19 will cause a downward flow of vapors in pipe 13, which downward flow may, if desired, be assisted by a blower 21 driven in any manner, as by motor 22.

The withdrawal of vapors through pipe 20 is controlled by valve 23, which is so constructed and adjusted as to maintain a definite pressure and therefore a definite temperature within the refrigerant chamber regardless of what pressure is maintained in pipe 20. Vapors passing out through pipe 20 first pass through chamber 24 in which plates 25 may be positioned to prevent escape of liquid particles.

Dispersed particles of liquid refrigerant that coalesce or deposit upon or flow over the interior surface of the refrigerating-medium container will, at least for the most part, be in the form of a film, a condition that is conducive of evaporation and consequent heat absorption, and any body of liquid refrigerant which is produced by coalescing of particles thereof and which does evaporate will flow into chamber 26 and may be redispersed. While nozzle 19 may be of any desired construction, it may be, as shown, somewhat in the form of a Venturi tube. A liquid return conduit 27 controlled by valve 28, which may be opened at suitable intervals, has one of its ends extending into that part of chamber 26 in which liquid collects and has the other of its ends opening at a point within the influence of the entraining action of the liquid passing through nozzle 19. When the nozzle is of the form shown the upper end of conduit 27 leads into the constricted part of the nozzle.

Volatile liquid refrigerant is supplied through pipe 17 at a pressure that will maintain the refrigerant in liquid state therein to a desired extent at the existing temperature and which will produce a desired dispersion of the liquid when it is sprayed and which will produce the desired circulation of the vapors and of a fog of refrigerant particles within the cooling circuit.

In the construction shown diagrammatically in Fig. 2 similar features of operation are employed in a modified construction. In this form of apparatus the nozzle 19 is located, as shown, in upper header 10 above tube 13 or between tube 13 and tubes 12 and different means is employed for the redispersing of liquid refrigerant that accumulates or collects in the system, and vapors are withdrawn from the lower header 11. From chamber 26 liquid is passed by pipe 29 controlled by valve 30 into a tank 31. From tank 31 liquid passes through pipe 32 controlled by valve 33 into a second tank 34. From tank 34 a pipe 35 controlled by valve 36 leads to a secondary nozzle 37 located at a suitable point in the chilling coil. Liquid collected in chamber 26 may be passed into tank 31, which is insulated. When a sufficient quantity of liquid has accumulated in tank 31 it is passed into tank 34 which is not insulated and the resulting rise in temperature will produce a pressure, when valve 33 is closed, that will cause the liquid to be dispersed through nozzle 37. As an alternative, liquid accumulating in chamber 26 may be drawn by pump 40 through pipe 38 that is controlled by valve 39, and passed through pipe 41 controlled by valve 42 into pipe 35 and through nozzle 37.

While I have described my invention in great detail it is to be understood that my invention is not limited to such details but includes such variations and modifications as fall within the hereunto appended claims.

I claim:

1. In the chilling of substances by heat exchange with a refrigerating medium contained in a ring-like container disposed in a substantially vertical plane, the steps comprising dispersing a volatile liquid refrigerant within the container while maintaining a circulation around the ring-like container of gas into which the refrigerant is dispersed, withdrawing gas from the interior of the container, and removing bodies of liquid collecting in the bottom of the container and thereby maintaining the interior of the container unsealed by liquid throughout its ring-like extent and maintaining substantially uniform pressure throughout the ring-like interior of the container.

2. In the chilling of substances by heat exchange with a refrigerating medium contained in a ring-like container, the steps comprising dispersing a volatile liquid refrigerant within the container while maintaining a circulation around the ring-like container of gas into which the refrigerant is dispersed, withdrawing gas from the interior of the container, and removing bodies of liquid collecting in the interior of the container and thereby maintaining the interior of the container unsealed by liquid throughout its ring-like extent and maintaining substantially uniform pressure throughout the ring-like interior of the container.

3. In the chilling of substances by heat exchange with a refrigerating medium contained in a ring-like container, the steps comprising dispersing a volatile liquid refrigerant within the container while maintaining a circulation around the ring-like container of gas into which the refrigerant is dispersed, withdrawing gas from the interior of the container, and maintaining the ring-like interior of the container unsealed by liquid throughout its ring-like extent and thereby maintaining substantially uniform pressure throughout the ring-like interior of the container.

4. In the chilling of substances by heat exchange with a refrigerating medium contained in a ring-like container, the steps comprising dispersing a volatile liquid refrigerant within the container while maintaining a circulation around the ring-like container of gas into which the refrigerant is dispersed, withdrawing gas from the interior of the container, and so relating the quantity of liquid so dispersed to the quantity of gas so withdrawn as to maintain the ring-like interior of said container unsealed by liquid throughout its ring-like extent and thereby maintaining substantially uniform pressure throughout the ring-like interior of the container.

5. In the chilling of substances by heat exchange with a refrigerating medium contained in a ring-like container, the steps comprising jetting a liquid volatile refrigerant in a dispersed state into the container in such direction as to promote circulation of gas carrying dispersed particles of refrigerant around the ring-like interior of the casing, withdrawing gas from the container, and maintaining the ring-like interior of the container unsealed by liquid throughout its ring-like extent and thereby maintaining substantially uniform pressure throughout the ring-like interior of the container.

6. In the chilling of substances by heat exchange with a refrigerating medium contained in a ring-like container, the steps comprising dispersing a volatile liquid refrigerant within the container while maintaining a circulation around the ring-like container of gas into which the refrigerant is dispersed, withdrawing gas from the interior of the container, and redispersing within the container bodies of liquid collecting in the interior of the container and thereby maintaining the interior of the container unsealed by liquid throughout its ring-like extent and maintaining substantially uniform pressure throughout the ring-like interior of the container.

7. In the chilling of substances by heat exchange with a refrigerating medium contained in a ring-like container, the steps comprising dispersing a volatile liquid refrigerant within the container while maintaining a circulation around the ring-like container of gas into which the refrigerant is dispersed, withdrawing gas from the interior of the container, and withdrawing from within the ring-like interior of the casing and redispersing therein bodies of liquid collecting within the container and thereby maintaining the interior of the container unsealed by liquid throughout its ring-like extent and maintaining substantially uniform pressure throughout the ring-like interior of the container.

8. In the chilling of substances by heat exchange with a refrigerating medium contained in a ring-like container, the steps comprising dispersing a volatile liquid refrigerant within the container by jetting volatile liquid refrigerant under pressure into the interior of the container, and by the entraining action of the liquid being jetted into the container drawing into that liquid bodies of liquid collecting in the container and thereby maintaining the interior of the container unsealed by liquid throughout its ring-like extent and maintaining substantially uniform pressure throughout the ring-like interior of the container.

9. In chilling apparatus, a ring-like refrigerating-medium container disposed in a substantially vertical plane and having a vapor outlet, means for maintaining in heat exchange relation with the medium therein a substance to be chilled, a liquid-dispersing jet supplied with volatile liquid refrigerant and discharging into said container in such direction as to promote circulation of gas around the ring-like interior of said container, a conduit leading from the bottom of said ring-like container, and means for passing liquid through said conduit at a rate sufficient to prevent liquid sealing of the interior of said ring-like container.

10. In chilling apparatus, an interiorly ring-like container for refrigerating medium, means for maintaining in heat exchange relation with the medium therein a substance to be chilled, means for withdrawing vapor from the container, a liquid-dispersing jet supplied with volatile liquid refrigerant under pressure and discharging in said container in a direction to promote circulation around its ring-like interior of vapor containing dispersed particles of volatile liquid refrigerant, and means for maintaining the ring-like interior of said container unsealed by liquid throughout its ring-like extent.

11. In chilling apparatus, a container for refrigerating medium, means for maintaining in heat exchange relation to the medium therein a substance to be chilled, means for withdrawing vapor from said container, a liquid-dispersing jet opening into said container and supplied with volatile liquid refrigerant under pressure, and a conduit leading from the bottom of said container and having its outlet subject to the entraining action of said jet.

12. In chilling apparatus, an interiorly ring-like container for refrigerating medium, means for maintaining in heat exchange relation with the medium therein a substance to be chilled, means for withdrawing vapor from the container, a liquid-dispersing jet supplied with volatile liquid refrigerant under pressure and discharging in said container, a vapor pump interposed in said container at one point of its ring-like extent for causing circulation of vapor around the ring-like interior thereof, and means for maintaining said interior unsealed by liquid at all parts of its extent.

13. In the chilling of substances by heat exchange with a refrigerating medium contained in a ring-like container, the steps comprising dispersing a volatile liquid refrigerant within the container while maintaining a circulation around the ring-like container of gas into which the refrigerant is dispersed, withdrawing gas from the interior of the container, maintaining the ring-like interior of the container unsealed by liquid throughout its ring-like extent and thereby maintaining substantially uniform pressure throughout the ring-like interior of the container, and adjustably regulating the pressure within said container independently of the pressure upon the refrigerant outside of said container to control the pressure of the dispersed refrigerant within the container and thereby control its temperature.

LEO D. JONES.